United States Patent [19]
Schwartz

[11] Patent Number: 5,208,617
[45] Date of Patent: May 4, 1993

[54] SUNGLASSES HAVING REVERSIBLE WATCH

[76] Inventor: Sandra Schwartz, 8601 NW. 47th St., Lauderhill, Fla. 33351

[21] Appl. No.: 790,528

[22] Filed: Nov. 12, 1991

[51] Int. Cl.⁵ .............................................. G02C 1/00
[52] U.S. Cl. ...................................... 351/158; 351/41
[58] Field of Search .......................... 351/41, 158, 57; 368/10; 2/13

[56] References Cited
U.S. PATENT DOCUMENTS
4,806,011  2/1989  Bettinger .............................. 351/158

Primary Examiner—Rodney B. Bovernick

[57] ABSTRACT

A pair of sunglasses in which a watch is inserted that can be reversed to the inside or outside of the sunglasses by means of a gasket, eliminating the encumberment of wearing a wrist watch to the beach and other outdoor activities by men and women.

2 Claims, 2 Drawing Sheets

SUNGLASSES HAVING REVERSIBLE WATCH

BACKGROUND OF THE INVENTION

1. Field of the Invention

To provide a dual purpose product for outdoor use that integrates a watch into a pair of sunglasses, eliminating the encumberment of wearing a wrist watch.

2. Prior Art

Most people when they are outdoors wear sunglasses to protect the eyes against the damaging rays of the sun, the sunglasses of the present invention were made and designed to be worn for the beach and other outdoor activities by men and women.

Inventions in the past have been aimed towards specialized applications. To mention a few, U.S. Pat. No. 4,274,149 by Flanagan, issued Jun. 16, 1981, described an electronic timer built into binoculars, to superimpose timing information on to the binocular field of view, for timing sports events. U.S. Pat. No. 4,526,473 by Zahn III, issued Jul. 2, 1985, describes a sports timer, combined with a pair of goggles to display timing information for athletes while performing. U.S. Pat. No. 4,751,691 by Perera, issued Jun. 14, 1988, describes an electronic time-piece with spectacles or sunglasses to have the capability of projecting and displaying the time of day or night conveniently for the elderly or those with vision impairment, who use spectacles. U.S. Pat. No. 4,867,551 by Perera, issued Sep. 19, 1989, attempts at improving his previous patent by use of a miniature display projection system, providing useful displays such as time of day or even video images.

SUMMARY OF INVENTION

The present invention is a pair of sunglasses in which a watch is inserted that can be reversed to the inside or outside of the sunglasses by means of a gasket. This invention has the combined attributes of eliminating the use of wearing a wrist watch to the beach when your trying to get a tan or worrying about breaking your wrist watch when participating in outdoor activities or sports, with the ease of being able to reverse the watch to the inside or the outside of the sunglasses, and being inexpensive to manufacture.

DESCRIPTION OF THE EMBODIMENTS

Figure 1:
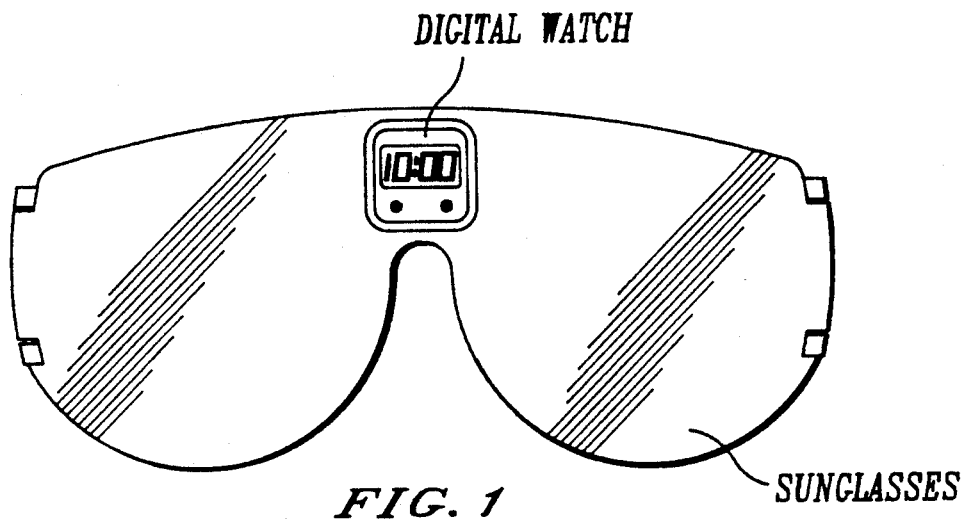
FIG. 1 is a front view of one embodiment having a cut-out in the center of the frame.

FIG. 1 Shows a front view of the sunglasses in which a cutout (in the shape of the watch) was made preferably in the center of a pair of sunglasses with the watch mechanism inserted and facing out. Note: watch mechanism may be inserted in either orientation, (i.e. facing in or out), depending on the user's preference. The watch does not obstruct or distort the user's vision. In this version a watch is affixed into a rubber or plastic grooved gasket and snapped into the sunglasses frame using the ridges designed into the cutout of the sunglasses frame. Digital or analog watch mechanism may be used. Watch may be water resistant or waterproof.

Figure 2:
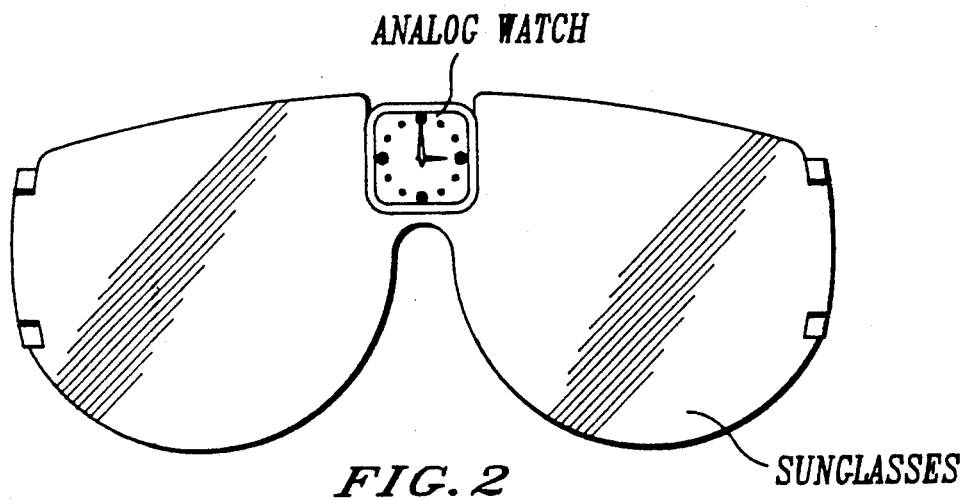
FIG. 2 is a front view of one embodiment having a cutout in the top center of the frame.

FIG. 2 Shows a front view of the sunglasses in which a cutout (in the shape of the watch) was made preferably in the top center of a pair of sunglasses, also with the watch mechanism inserted and facing out. Note: watch mechanism may be inserted in either orientation, (i.e. facing in or out), depending on the user's preference. The watch does not obstruct or distort the user's vision. In this version a watch is affixed into a rubber or plastic grooved gasket and installed from the top of the sunglasses frame and is slid into the sunglasses frame using the ridges designed into the cutout of the sunglasses frame. Digital or analog watch mechanism may be used. Watch may be water resistant or waterproof.

Figure 3:
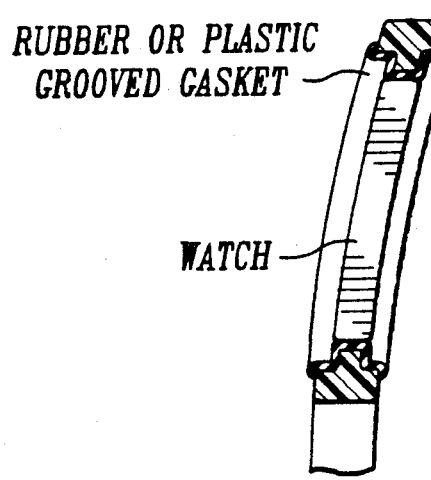
FIG. 3 is a cross-sectional view of FIG. 1.

FIG. 3 Shows a cross-sectional view of FIG. 1, depicting the watch installed and held into place by means of a rubber or plastic grooved gasket that fits over the ridges designed into the cutout in the sunglasses frame.

Figure 4:
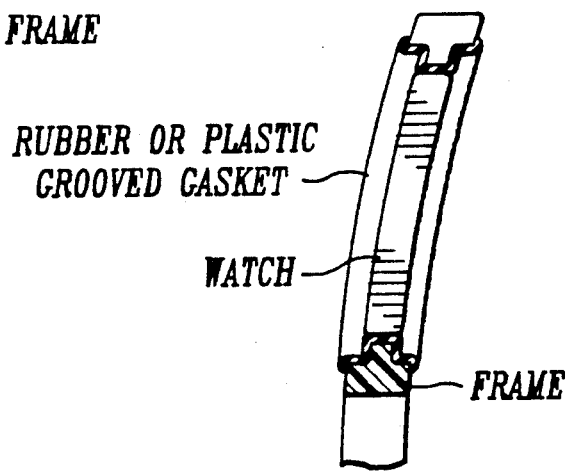
FIG. 4 is a cross-sectional view of FIG. 2.

FIG. 4 Shows a cross-sectional view of FIG. 2, depicting the watch installed and held in place by means of a rubber or plastic grooved gasket that fits in place over the ridges designed into the the cutout in the sunglasses frame.

Figure 5:
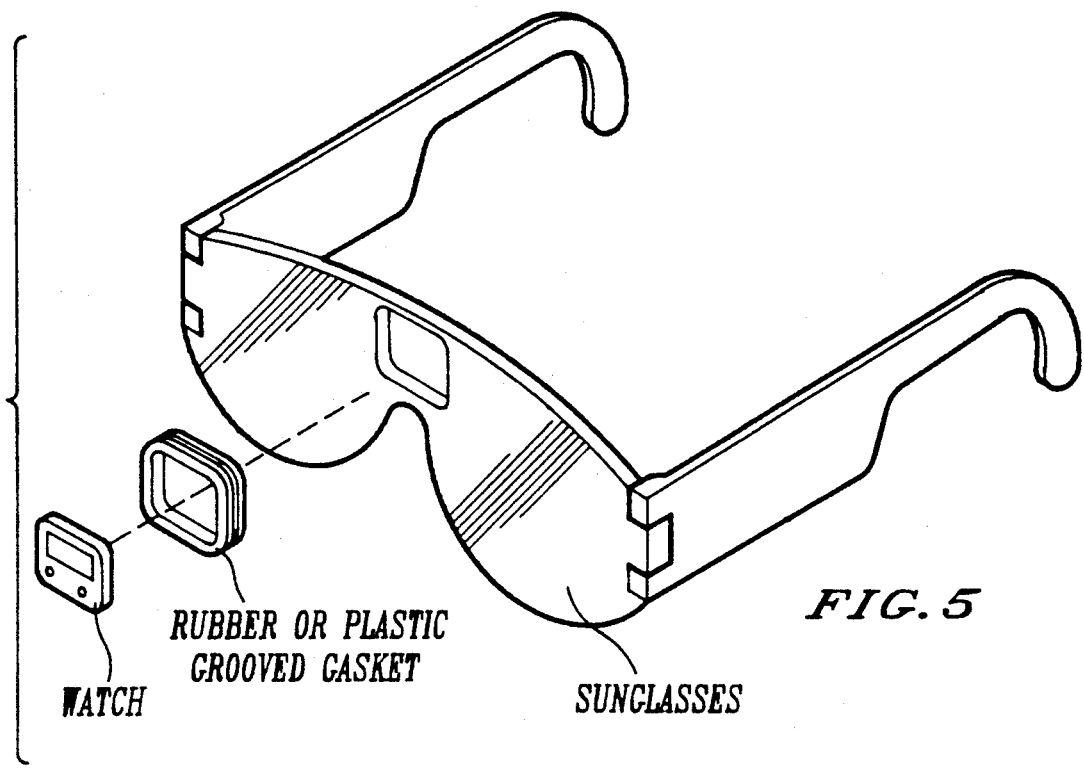
FIG. 5 is an exploded view of FIG. 1.

FIG. 5 Shows a prespective view of the sunglasses frontal insertion (FIG. 1) with the watch and rubber or plastic grooved gasket exploded out from the frame.

Figure 6:
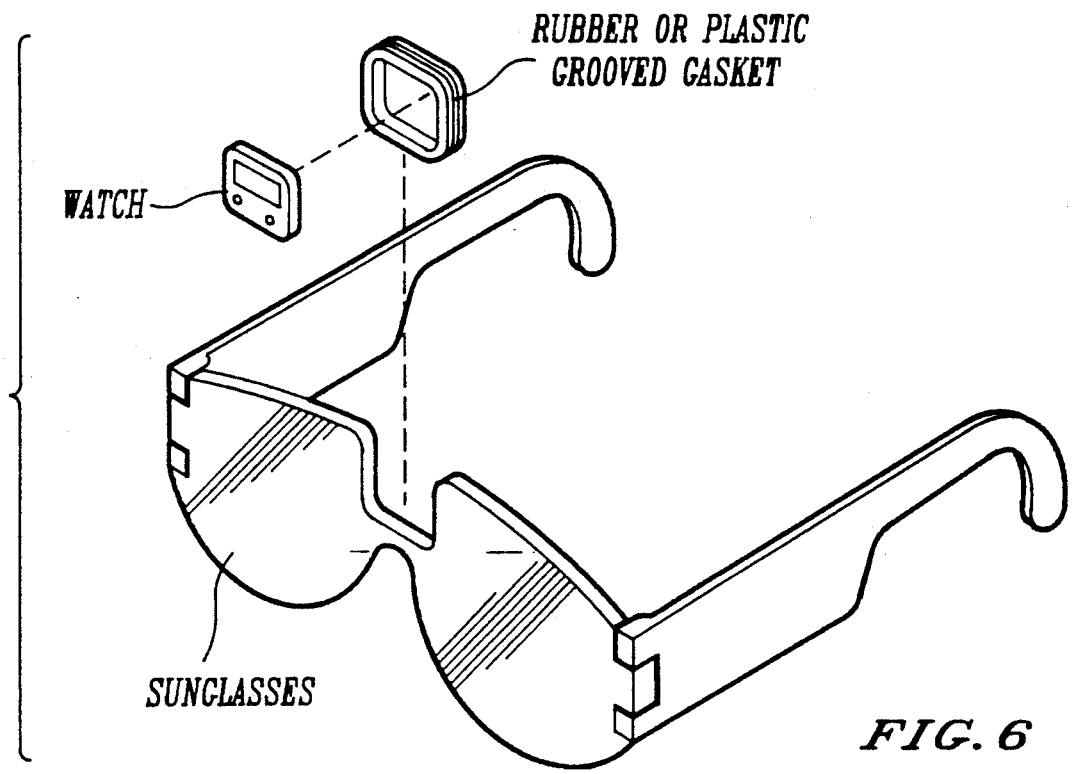
FIG. 6 is an exploded view of FIG. 2.

FIG. 6 Shows a perspective view of the sunglasses top insertion (FIG. 2) with the watch and rubber or plastic grooved gasket exploded out from the frame.

It will be obvious to those skilled in the art that various changes may be made without departing from the scope of the invention and the invention is not to be considered limited to what is shown in the drawings and described in the specification.

What is claimed is:

1. A pair of sunglasses comprising:
   a frame with a cutout in the center having ridges and
   a digital or analog water resistant or waterproof watch which is inserted in said cutout and which is reversible to the inside or outside of said sunglasses by means of a rubber or plastic grooved gasket;
   said digital or analog water resistant or waterproof watch being affixed to said gasket, said cutout being in the center of said frame, said watch and gasket snapping into the ridges designed into the cutout.

2. A pair of sunglasses comprising:
   a frame with a cutout in the top center having ridges and
   a digital or analog water resistant or waterproof watch which is inserted in said cutout and which is reversible to the inside or outside of said sunglasses by means of a rubber or plastic grooved gasket;
   said digital or analog water resistant or water proof watch being affixed to said gasket, said watch and gasket being installed from the top of the frame and slid into the ridges designed in the cutout in the sunglasses frame.

* * * * *